July 2, 1935. A. HUDIAKOFF Re. 19,629

APPARATUS FOR MULTIPLE VISUAL EFFECTS

Original Filed April 29, 1933 2 Sheets-Sheet 1

INVENTOR
Andrei Hudiakoff
BY
Blair Curtis & Dunne
his ATTORNEYS

APPARATUS FOR MULTIPLE VISUAL EFFECTS

Original Filed April 29, 1933 2 Sheets-Sheet 2

INVENTOR

Andrei Hudiakoff

BY

Blair Curtis & Dunne

Lio ATTORNEYS

Reissued July 2, 1935

Re. 19,629

UNITED STATES PATENT OFFICE 19,629

APPARATUS FOR MULTIPLE VISUAL EFFECTS

Andrei Hudiakoff, New York, N. Y.

Original No. 1,952,920, dated March 27, 1934, Serial No. 668,518, April 29, 1933. Application for reissue March 15, 1935, Serial No. 11,293

8 Claims. (Cl. 272—22)

Figure 1:
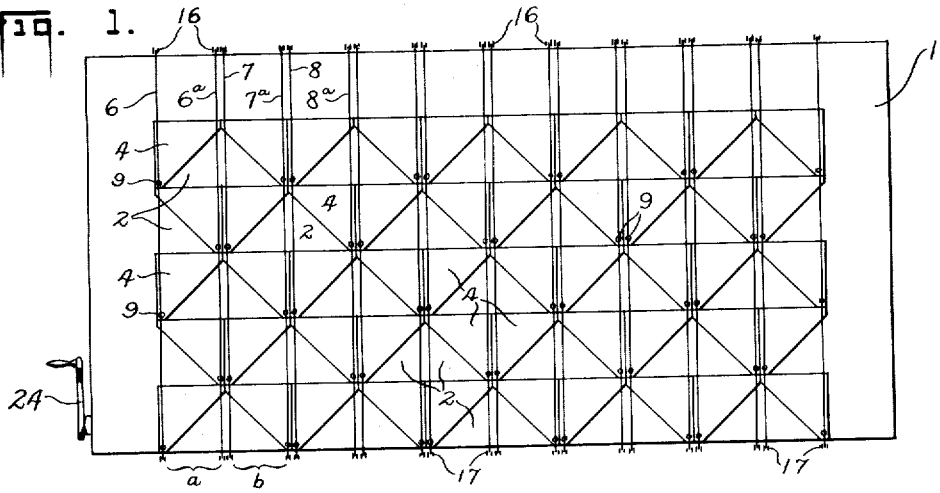

The present invention relates to an improvement in apparatus for multiple visual effects. One object thereof has been to provide a device which may be effectively applied to theatre curtains or sets, display apparatus, and the like, and which will permit the presentation of different visual effects under such circumstances that the changes can be made conveniently and effectively by simple mechanism and without undue wear and tear on the colored or other decorated or ornamented surfaces. A further object of this invention has been to provide a device of the kind referred to, wherein the parts may be actuated in any predetermined or desired sequence to produce novel and interesting progressively occurring changes of appearance in various directions across the display apparatus or theatre curtain as the case may be. A further object of the invention, more particularly when embodied in an outdoor display device, has been to minimize the effect of wind on the movable parts so that they may function effectively under all weather conditions.

One embodiment of my invention is illustrated in the drawings appended to the present specification and in which—

Figure 2:
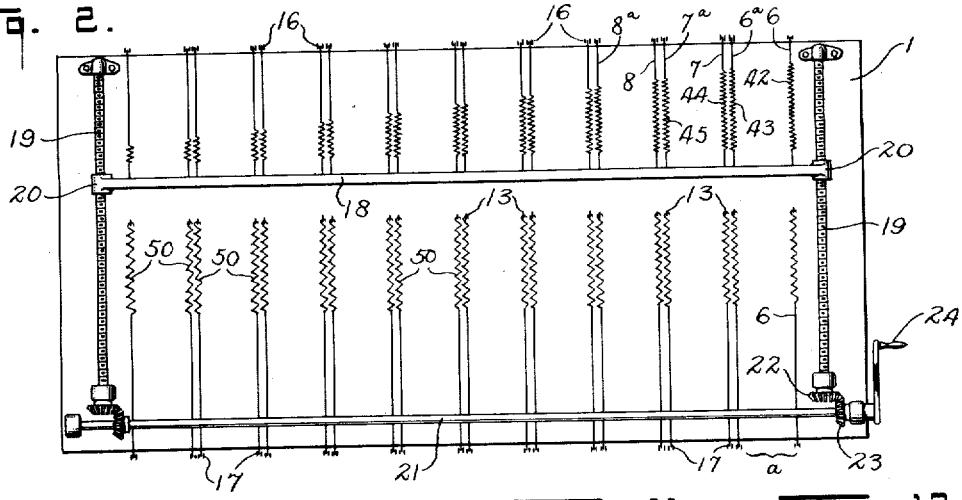
Figure 3:
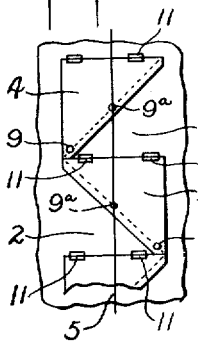
Figure 4:
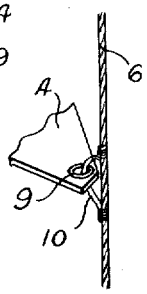
Figure 10:
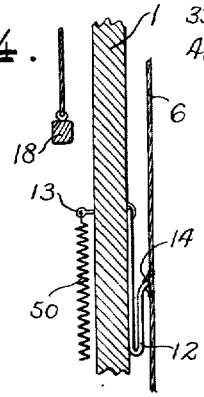
Figure 11:
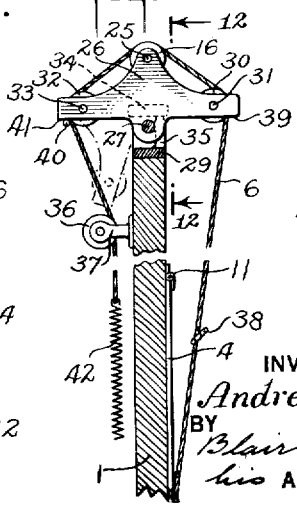
Figure 12:
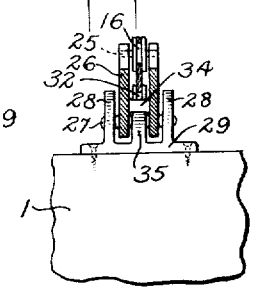
Figure 5:
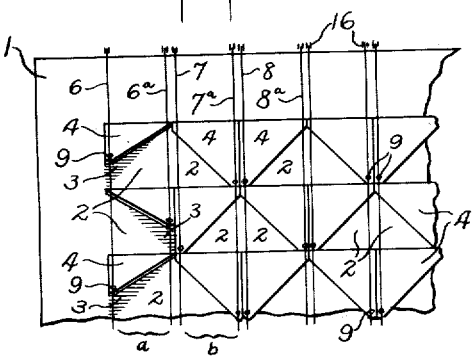
Figure 6:
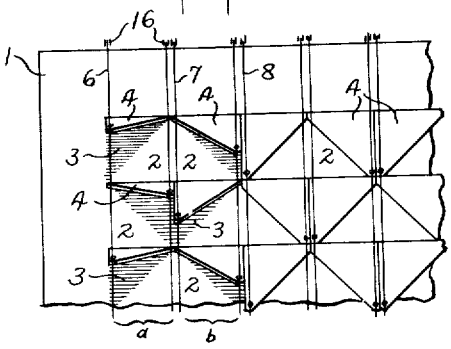
Figure 7:
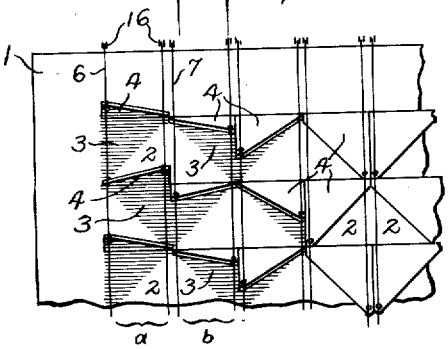
Figure 8:
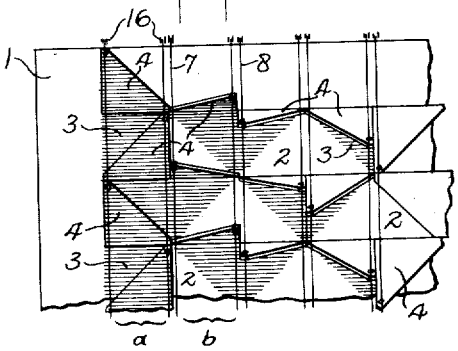
Figure 9:
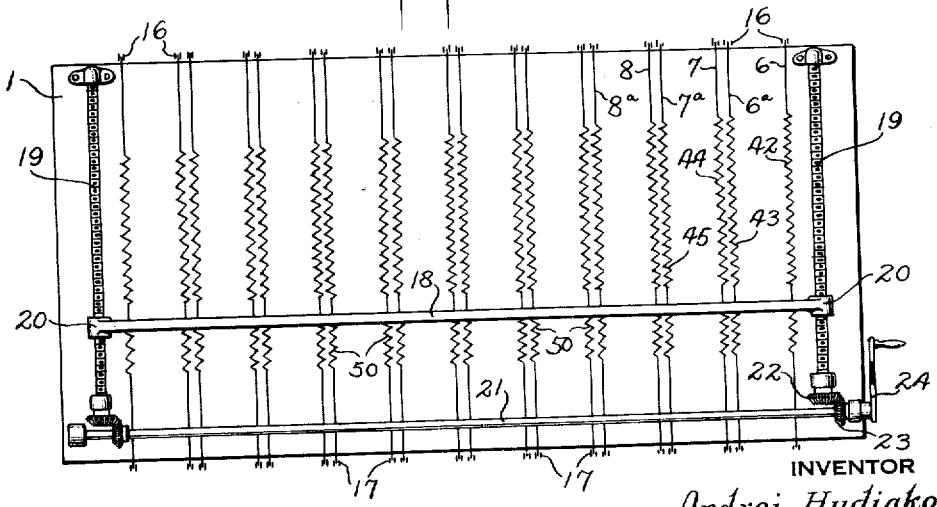

Figure 1 is a front view;

Figure 2, a rear view;

Figure 3, a detail illustrating one form of flap suitable for use in connection with the type of apparatus shown in Figure 1;

Figure 4, an enlarged detail illustrating one manner of connecting a flap to a draw wire;

Figure 5, a front elevation illustrating the first vertical row of flaps in partially raised position;

Figure 6, a similar view with the first vertical row of flaps raised to a higher position and the second row of flaps partly raised;

Figure 7, a similar view showing a further raising of the flaps;

Figure 8, a similar view showing the flaps in the first vertical row completely raised and with flaps in the succeeding vertical rows in different positions of adjustment in relation to the base;

Figure 9, a rear view of a modification wherein the ends of the draw wires are connected to move with the draw bar, and showing the relative positions of the draw wires and parts connected thereto when the flaps all occupy the extreme opposite position from that occupied by them as shown in Figure 2;

Figure 10, a view partly in section illustrating a modification in which the flaps are flexible instead of rigid;

Figure 11, a detail partly in section illustrating a rocking guide for the draw wire, and Figure 12, a view partly in section on the line 12—12 of Figure 11.

Referring to the drawings, my improved apparatus for multiple visual effects includes broadly a base 1 presenting an exposed or front surface, a plurality of flaps mounted thereon, and means for actuating some or all of said flaps at will to expose one or the other of the faces thereof to produce different visual effects in relation to said front surface and/or to each other. As seen more clearly in Figures 5 to 8 inclusive, a portion of the front or exposed surface of the base 1 presents an area 2 of a given visual effect, as white for example. Adjacent thereto is another portion of the same size and shape as 2 but presenting an area 3 of a different visual effect, as red. The areas 2 and 3 are formed into groups of areas which in the aggregate also present different visual effects.

As shown in Figure 1, flaps 4 are mounted on base 1 to overlie or, if desired, to conceal the areas 3 when in depending or down position. One side of each flap 4 may be of the same color or other visual effect as the areas 2, namely white, and the other side of the same color or visual effect as the areas 3, namely red; so that, when the flaps occupy the positions shown in Figure 1, a substantially uniform white color or visual effect is produced across the entire device. By turning or reversing the flaps 4 the white areas 2 are covered and the red areas 3 and the red sides of the flaps 4 are exposed thus changing the general appearance to red. With the flaps 4 in vertical row *a* turned to their extreme up position, as shown in Figure 8, the left end portion of the device presents what appears to be a continuous red color. Obviously, the apparatus is capable of utilizing a wide range of differences in visual effects beyond the simple color differences above noted.

The flaps 4 or other equivalents thereof may be turned or actuated by any suitable means. In the drawings, I have illustrated apparatus in which the flaps are moved by means of draw wires or the like, those in the first or lefthand vertical row *a* Figure 1, being attached to draw wires 6 and 6*a*, respectively, those in the next vertical row b to the right thereof being attached to draw wires 7 and 7*a* respectively, those next thereto being attached to draw wires 8 and 8*a* respectively, and so on across the base. As shown in Figure 3, the flaps may be slightly larger than the areas which they overlie, or are intended to conceal, and when the flap is rigid a single wire 5 turns all the flaps in the same vertical row. Each flap is provided with an opening or ring 9 or 9a adapted to engage a loop 10, or the like, Figure 4, secured to the draw wires 5 or 6, as the case may be.

The several flaps are mounted or hinged on the base 1 in any desired manner and preferably so that either side thereof may be exposed at will by the operator. Thus, the flaps may be secured to the base 1 by means of hinges 11, which connect edge portions of the flaps to the surface of the base 1 approximately along the dividing line between the areas 2 and 3 adjacent thereto. It will be clear that, with the apparatus thus far described, if the flaps 4 in row a of Figure 1 are in the position shown in said figure, they are reversed or turned by pulling upwardly on the draw wires 6 until they occupy the opposite extreme position, or that shown in Figure 8.

Where the flaps are made of a flexible material, as illustrated in Figure 10, their free ends are attached to the draw wire 6 by means of loops 14, or other suitable device. As the draw wire 6 is moved upwardly the free end of the flexible flap 12 moves therewith and is thereby folded back upon itself for a time and then is reextended with its free end held in the upper or reversed position.

Where the flap or flaps in any vertical row, as a or b, are weighted and are mounted for turning or reversing movement between their extreme positions in a vertical direction, the upward turn or deflection may be accomplished by any suitable application of force to effect endwise upward movement of the wire 6. Upon releasing said wire, the flap again moves downwardly to its first or extreme depending position.

Under some circumstances, it will be preferable to impart positive or controlled movement to the flap in both directions. For this purpose, the wire 6, in the embodiment indicated in Figures 1 and 2 for example, passes over a guide 16 at the top of the base 1 and, in the case of a device having a plurality of vertical rows of flaps, has one end attached to a draw bar 18 to which reciprocating vertical movement is imparted by means of a pair of helical screws 19 at the rear of base 1 and engaging corresponding nuts 20 which support the ends of said bar. The other end portion of wire 6 passes around a guide 17 at the bottom edge of base 1 and is anchored at 13 to any suitable fixed member, preferably to the rear of base 1, as shown in Figure 10. In the modification shown in Figure 9, both ends of wire 6 connect with draw bar 18 and move therewith when said bar is actuated. The helical screws 19 are actuated from a shaft 21 through bevelled gears 22 and 23, said shaft being turned by any suitable means, shown in Figure 2 as a crank 24 for manual operation, or a motor, not shown, for power operation. A coiled spring 50, Figure 2, is inserted in each draw wire and has such tensional qualities that it remains under sufficient tension to hold the flaps in depending position and yields enough to permit turning of the flaps from one extreme position, as down, to the extreme up position. Accordingly, with all of the springs 50 of substantially the same tensional effect, if the draw bar 18, Figures 2 and 9, is moved downwardly the flap ends will turn to the up position against the substantially uniform yielding resistance of said springs, and the change in visual effect takes place uniformly and simultaneously over the whole display.

A further feature of my invention involves means for actuating or turning the flaps from one extreme position to the other in some predetermined sequence to produce a wave or other illusion in the transition from one visual effect to another. Of course, all of the flaps can be raised or lowered at the same time as above suggested or some flaps can be raised and others can be lowered to produce various visual effects. However, the apparatus in the form illustrated is intended to cause the raising and/or lowering of the vertical rows of flaps progressively from one end to the other of the base 1. Thus, the flaps attached to the wires 6 will first be raised, then those attached to the wires 6a, then those attached to wires 7, and so on across the base.

One expedient for producing the successive movement of the vertical rows of flaps along with a continuous movement of the bar 18 involves the use of a plurality of springs 42, 43, 44, 45, etc., said springs having different tension characteristics or values of resistance to extension so that, with a given load, their respective limits of extensibility will be reached at different positions of or time intervals in the vertical travel of the bar 18.

Spring 42, Figure 2, in wire 6 is relatively long, or has some other characteristic, whereby it is capable of a relatively large amount of extension or stretching. It also has an initial set or resistance to stretching greater than that of spring 50. Spring 43, in wire 6a which is next in order may have a slightly shorter total stretch than spring 42 and preferably has less resistance to stretching. The gradation of the springs herein suggested may be carried on through the entire set of draw wires to produce any desired sequence of operation of the flaps. For example, where the springs 42, 43, 44, etc. are graded so that 42 does not yield until its flap reaches the up position, and 43 yields slightly before its flap begins to move up, and 44 yields still more, and so on across the display, said flaps will move or turn up in the order named.

In an arrangement where the first or any flap reaches its extreme position before another or others, as for example where flaps in the a vertical row reach the up position, Figure 8, their springs 42 and 43 will stretch during continued down movement of bar 18, or until the flaps in all the vertical rows have reached their respective up positions.

With the form of device above described, it will be apparent that where one end of the wire is fixed, as in the device shown in Figure 2, the amount of stretch of the springs 50 will be approximately the distance of endwise movement of a draw wire required for turning a flap from one extreme position to the other. In the modification shown in Figure 9, where both ends of the wire 6 travel with the bar 18, the amount of stretch of wires 50 need only be sufficient to supply the elongation required when the free end of the rigid flap passes through the arc between its extreme down and up positions. But the necessary amount of stretch of the respective other springs namely 42, 43, 44, etc. will vary from a maximum in the case of the spring in draw wire 6 which turns the first flap or vertical row of flaps to the minimum for the spring in the draw wire which pulls the last flap or last vertical row of flaps; and the tensional qualities of the springs 42, 43, etc. will vary from a maximum of stiffness in spring 42 to a minimum in the last spring. It is this gradation or variation in stiffness or yield point load of the springs 42, 43, etc. which controls the sequence or order of turning of the flaps in the illustrated embodiment of my invention.

In the form of apparatus shown in Figures 11 and 12, and intended more particularly for installation where space is limited, the top guide roller 16 is pivotally mounted at 25 in a rocking frame 26 supported on a pintle 27 which extends between the uprights or standards 28 of a bracket-like fitting 29 secured at the top edge of the base member 1, one such fitting or bracket being supplied for each draw wire. The guide frame assembly also includes a guide or roller 30 pivotally mounted at 31 in frame 26 and a roller 32 pivotally mounted at 33 in said frame. A web 34 extending across the interior of the frame 26 serves as an abutment to engage a detent or stop 35 when the frame occupies the position shown in Figure 11. A further guide for the draw wire 6 is provided in the guide roller 36 pivotally mounted on a bracket 37 secured to the rear side of the base member 1. When said wire is actuated to move in the direction of the arrow, Figure 11, the frame 26 tilts rearwardly around or on the shaft or pintle 27 and in such a manner that, when flap 4 reaches its upturned position, the draw wire 6 will be close to and substantially parallel with the face of the base 1 and close to or bearing against portions of the flaps to which it is attached. If the frame 26 fails to rock rearwardly when the leading end of wire 6 is first moved in the direction of the arrow, said rearward rocking will take place when movement of the wire brings a lug 38 or other stop member into engagement with an extension 39 of the frame 26. When this occurs, sliding or advancing movement of the draw wire in relation to the several pulleys mounted in the frame is stopped and the only remaining movement is that occasioned by the rocking back of the frame 26 into a tilted position, or such that the pulley 30 now lies above the upper edge of the base member 1, while the other pulleys 32 and 16 lie rearwardly thereof. A lug or stop member 40, similar to 38, engages a rearwardly extending portion 41 of the frame 26 to rock said frame back into the position shown in Figure 11 when the flaps are moved to down position.

From the foregoing description and stated mode of operation of one embodiment of my invention, it appears that I have provided a theatrical or display apparatus which is capable of presenting different visual effects of wide variety. The arrangement whereby the changes are effected by turning or reversing flaps hinged to the base has the advantage that the flaps are not scraped or brushed and may consequently retain their colors, markings, or other surface characteristics over a long period of use. The controlled sequence of turning or reversing of the flaps greatly extends the number of variations in appearance which may be obtained in the use of one apparatus. Further, where the draw wires hug the flaps or are held taut in relation to or against the flaps, as by the springs above described, my improved device may be used effectively out of doors and with no serious interruption from wind pressure on the flaps, which are under effective control during normal or usual weather conditions.

I claim—

1. Apparatus for multiple visual effects comprising a base member having a surface of which certain portions present a first group of areas producing one visual effect and other portions substantially like said first mentioned portions in size and shape present a second group of areas producing another visual effect, each of said areas of the second group being adjacent to an area of the first group, a plurality of movable flaps of substantially the size and shape of said areas and of each of which one side presents a visual effect different from that of the other side, each of said flaps having an edge portion secured to said base approximately along a line between an area of the first group and an adjacent area of the second group, means for repositioning said flaps to effectively expose one side or the other of each one thereof at will and whereby, in one position, each flap effectively conceals an area of one group and, in another position, conceals an area of the other group, means cooperating with the repositioning means for controlling the order in which said flaps are repositioned by operation of the repositioning means, said repositioning means including a movable carrier and a plurality of draw wires each secured to one of said flaps and to said carrier, means for actuating the carrier, and means connected to and interposed between the carrier and the flaps to effect differential movement as between one flap and another while the carrier is moved in one direction.

2. Apparatus for multiple visual effects comprising a base member having a surface of which certain portions present a first group of areas producing one visual effect and other portions substantially like said first mentioned portions in size and shape present a second group of areas producing another visual effect, each of said areas of the second group being adjacent to an area of the first group, a plurality of movable flaps of substantially the size and shape of said areas and of each of which one side presents a visual effect different from that of the other side, each of said flaps having an edge portion secured to said base approximately along a line between an area of the first group and an adjacent area of the second group, means for repositioning said flaps to effectively expose one side or the other of each one thereof at will and whereby, in one position, each flap effectively conceals an area of one group and, in another position, conceals an area of the other group, and means cooperating with the repositioning means for controlling the order in which said flaps are repositioned by operation of the repositioning means, said repositioning means including a movable carrier and a plurality of draw wires each secured to one of said flaps and to said carrier, means for actuating the carrier, and springs having different tensional characteristics operatively connected to said flaps and to said carrier to effect differential movement as between one flap and another while the carrier is moved in one direction.

3. Apparatus for multiple visual effects comprising a base member having a surface of which certain portions present a first group of areas producing one visual effect and other portions present a second group of areas producing another visual effect, each of said areas of the second group being adjacent to an area of the first group, a plurality of movable flaps of each of which one side presents a visual effect different from that of the other side and each of said flaps having an edge portion secured to said base approximately along a line between an area of the first group and an adjacent area of the second group, means for turning said flaps to effectively expose one side or the other thereof at will, means cooperating with the turning means for controlling the order in which said flaps are turned including a movable draw bar and a plurality of draw wires each secured to one of said flaps and said bar, means for actuating the bar, and means connected to and interposed between the bar and the flap to effect differential turning movement as between one flap and another while the bar is moved in one direction.

4. Apparatus for multiple visual effects comprising a base member having a surface of which certain portions present a first group of areas producing one visual effect and other portions present a second group of areas producing another visual effect, each of said areas of the second group being adjacent to an area of the first group, a plurality of movable flaps each having an edge portion secured to said base approximately along a line between an area of the first group and an adjacent area of the second group, means for turning one after another of said flaps to effectively expose one side or the other of each flap at will including a movable draw bar, a draw wire for each flap, said wires being attached respectively to spaced portions of said bar, springs having different values of resistance to extension operatively connected to said several draw wires between the bar and the flaps, and means for moving the draw wires to extend or to retract said springs in a sequence determined by their relative resistance to extension values.

5. Apparatus for multiple visual effects comprising a base member having a surface of which one portion presents an area having one visual effect and another portion presents an area having a different visual effect, a swingable flap having an edge portion hinged to said base approximately along a line between said areas and adapted to swing from one extreme position wherein it covers one of said areas to another extreme position wherein it covers the other of said areas, a draw wire secured to said flap and mounted for endwise movement in opposite directions to swing the flap from one of said extreme positions to the other, draw wire actuating means operatively connected to said draw wire for imparting said endwise movement thereto, and spring means interposed in said wire between said actuating means and said flap to provide for elongation of the effective length of the draw wire while the flap swings from one of said extreme positions to the other.

6. Apparatus according to claim 5 and draw wire guide supporting means mounted adjacent to edge portions of said base, and draw wire guiding means mounted on said supporting means, said draw wire being mounted in operative engagement with said guiding means.

7. Apparatus according to claim 5 and having a rocking guide support pivotally mounted on said base, and guides journalled in said support, said draw wire being carried in contact with said guides.

8. Apparatus according to claim 5 and including a plurality of flaps and of draw wires severally connected thereto and actuated by said draw wire actuating means, and means connected to said draw wire actuating means for effecting differential movement as between one flap and another during operation of said actuating means.

ANDREI HUDIAKOFF.